S. R. HOWARD.
SHEET FEEDING MECHANISM.
APPLICATION FILED JAN. 6, 1919.

1,335,336.

Patented Mar. 30, 1920.
6 SHEETS—SHEET 1.

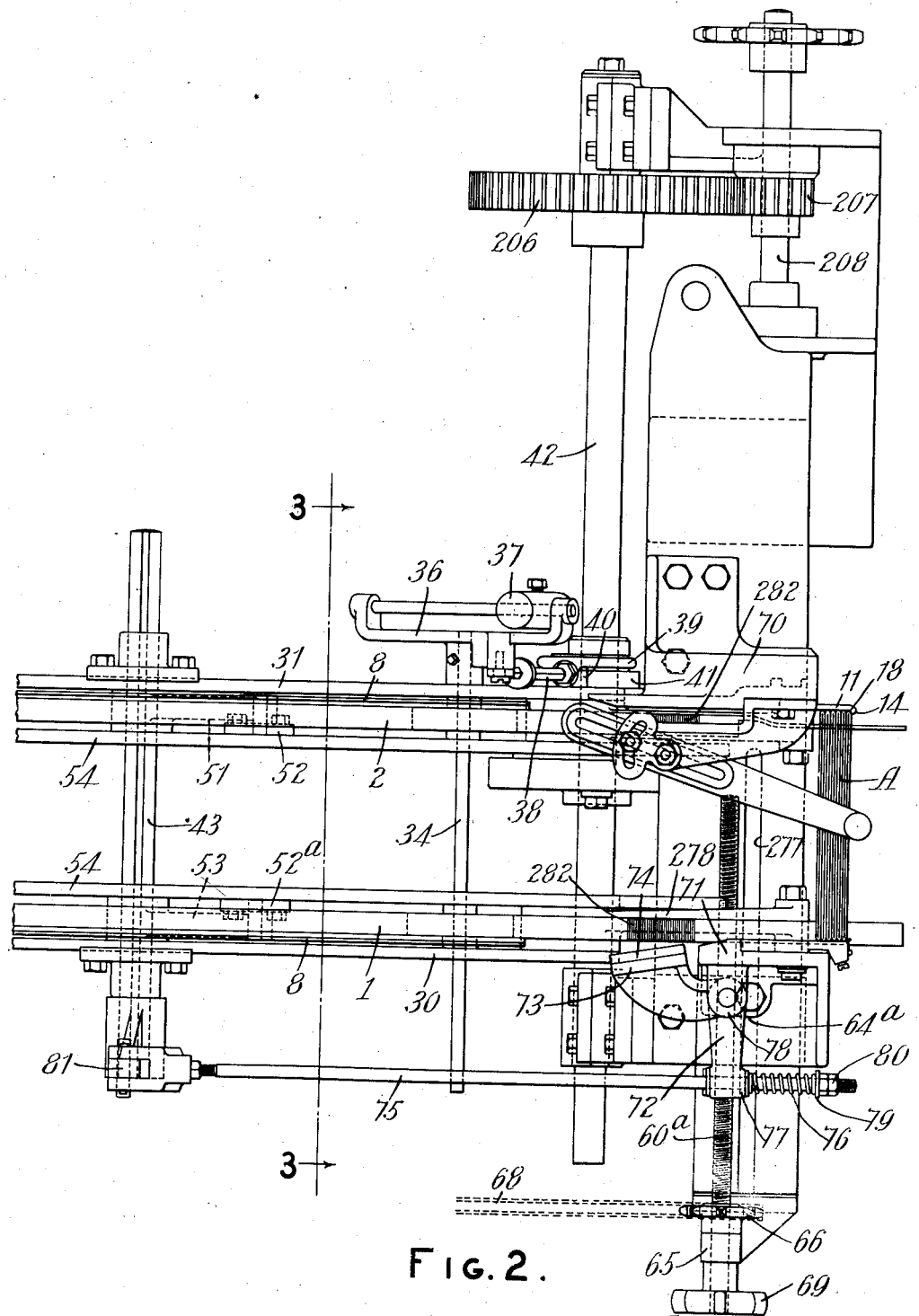

S. R. HOWARD.
SHEET FEEDING MECHANISM.
APPLICATION FILED JAN. 6, 1919.
1,335,336.
Patented Mar. 30, 1920.
6 SHEETS—SHEET 3.
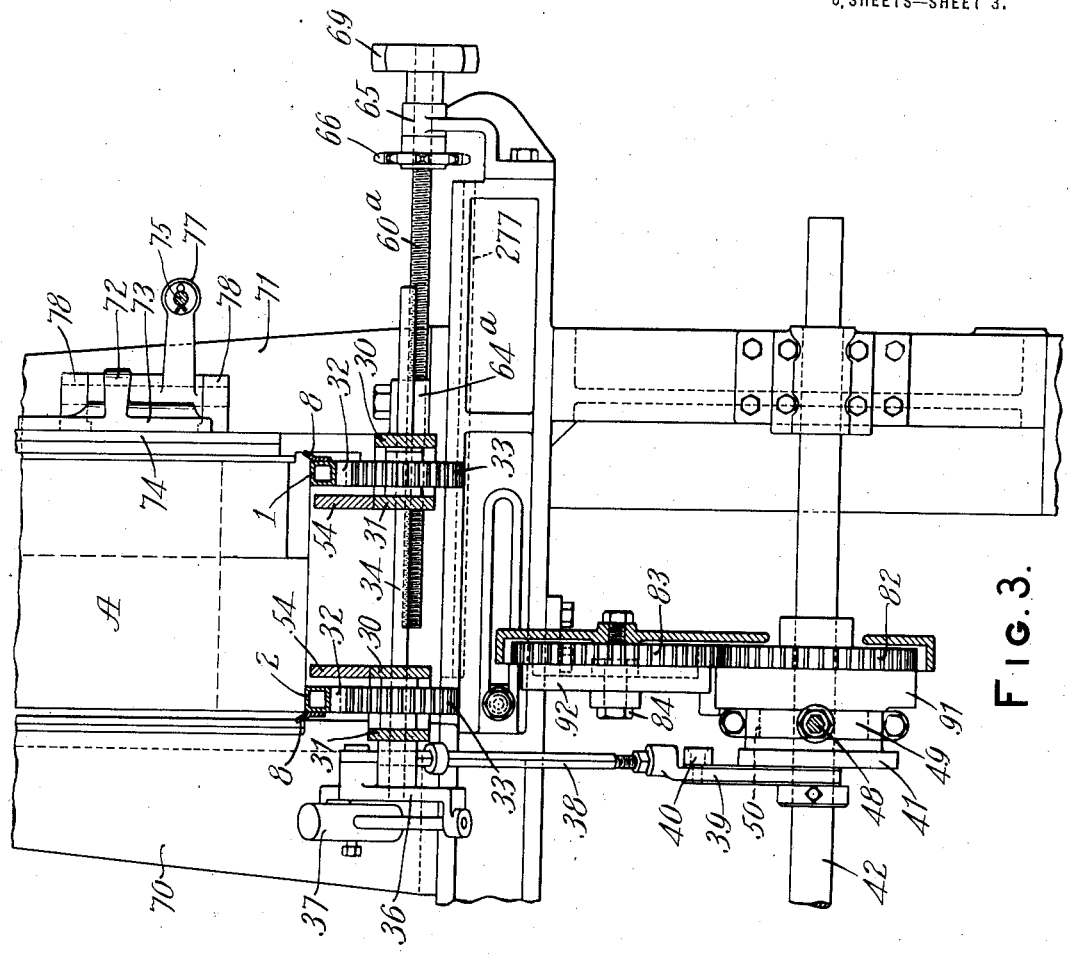

UNITED STATES PATENT OFFICE.

STANLEY R. HOWARD, OF BOSTON, MASSACHUSETTS, ASSIGNOR TO PNEUMATIC SCALE CORPORATION, LIMITED, OF QUINCY, MASSACHUSETTS, A CORPORATION OF MAINE.

SHEET-FEEDING MECHANISM.

1,335,336.  Specification of Letters Patent.  Patented Mar. 30, 1920.

Original application filed December 1, 1917, Serial No. 204,974. Divided and this application filed January 6, 1919. Serial No. 269,789.

*To all whom it may concern:*

Be it known that I, STANLEY R. HOWARD, a citizen of the United States, residing at Boston, county of Suffolk, State of Massachusetts, have invented a certain new and useful Improvement in Sheet-Feeding Mechanism, of which the following is a specification, reference being had therein to the accompanying drawings.

This is a division of an application filed by me December 1, 1917, Serial No. 204,974. The invention relates to mechanism for feeding sheets or blanks, especially sheets or blanks of paper or paper board, and relates more especially to automatic mechanism for feeding a collection or stack of blanks standing on edge face to face and delivering them one at a time to mechanism for performing certain other operations upon them. One object of the invention is to provide a horizontally reciprocable stack support or holder which shall move forward in a step by step movement feeding one blank at a time until a predetermined number of blanks have been discharged or the stack holder has been moved forward a certain predetermined distance and then the pressure of the weight of the stack upon the holder is released while the stack holder is moved backward without moving the stack backward and then the stack is redeposited upon the holder for another forward movement of the holder and the period of feed of the blanks.

One of the particular uses for which the machine is intended is to feed blanks which have already been partially formed into knock down cartons and are in their flattened and distended form, as before being squared out or the end flaps folded, and to deliver the blanks in this form while standing on end to other mechanism which opens and squares out the cartons into tubular form and folds the end flaps. The blanks shown in the drawings are for illustration of the character just above mentioned although it is to be understood that the invention is not limited to mechanism used for feeding blanks of that particular kind, nor feeding them to a carton folding mechanism, nor are the claims intended to be so limited. The invention may be applied to a feed mechanism for blank sheets whatever use may be made of the sheets after they are discharged from the feed mechanism.

The feeding mechanism comprises a reciprocable support or magazine for the blanks which in the preferred form consists of longitudinally reciprocable rails which serve both as a magazine and as a feed to the other operating devices whatever they may be. Provision is made by which a large number of blanks may be arranged in a stack on the said rails, the blanks all standing on the rails after the manner of vertical filing instead of being superimposed upon each other and this stack may extend for a length of a number of feet if desired, the rails being of suitable length for that purpose. It is desirable, however, to have a relatively short reciprocating movement of the feed rails, as for instance, a distance of a few inches, sufficient to feed a limited number of cartons, twenty-five for instance, before the rails are moved back preparatory to a new forward movement. The feed rails move forward carrying the row of blanks with them one step at a time equal to the thickness of the space occupied by a blank as often as a blank is removed from the rails by the transfer mechanism which carries it to the opening out mechanism. After the predetermined number of blanks have been taken out one at a time it is necessary that the feed rails should move backward ready for another forward movement. When the feed rails move backward, however, the stack of blanks should not be carried back with it, but should remain with the foremost blank in position to be seized in regular uninterrupted progress by the mechanism which opens it for the operation of breaking the spring along the folding lines and for carrying it to the squaring out mechanism previously referred to. The backward movement of the said feed rails while the blanks remain in forward position is for the purpose of obtaining a continued step by step forward feed for the blanks and a short length of travel of the rails. In order, therefore, that the stack of blanks may not be carried back with the feed rails, mechanism is provided for automatically relieving the pressure of the stack on the feed rails previous to the retrograde movement of the feed rails and then causing the stack to be redeposited on the feed rails before the feed rails start forward again. The feed rails extend forward a sufficient length so that the blanks will rest on the rails when the stack is redeposited at the end of the retrograde movement of the rails. The preferred method of temporarily relieving the feed rails from the pressure of the stack is to lift the stack from the feed rails, and the drawings show mechanism for relieving the pressure in that way, but it is to be understood that other suitable means for relieving the pressure may be employed and still be within the scope of the invention. Other features of the invention will be set forth hereinafter.

The invention will be fully understood from the following description when taken in connection with the accompanying drawings and the novel features thereof will be pointed out and clearly defined in the claims at the close of this specification.

In the drawings, Figure 1 is a left hand side elevation of a machine embodying the invention.

Fig. 2 is a plan view, the rear part of the machine being broken away.

Fig. 3 is a rear elevation partly in section on line 3—3 of Fig. 2, taken through the feed rails and partly broken away.

Fig. 4 is a plan view partly in section showing in detail and on a larger scale than Fig. 2 the forward part of the support for the stack and the side clamps.

Figure 8:
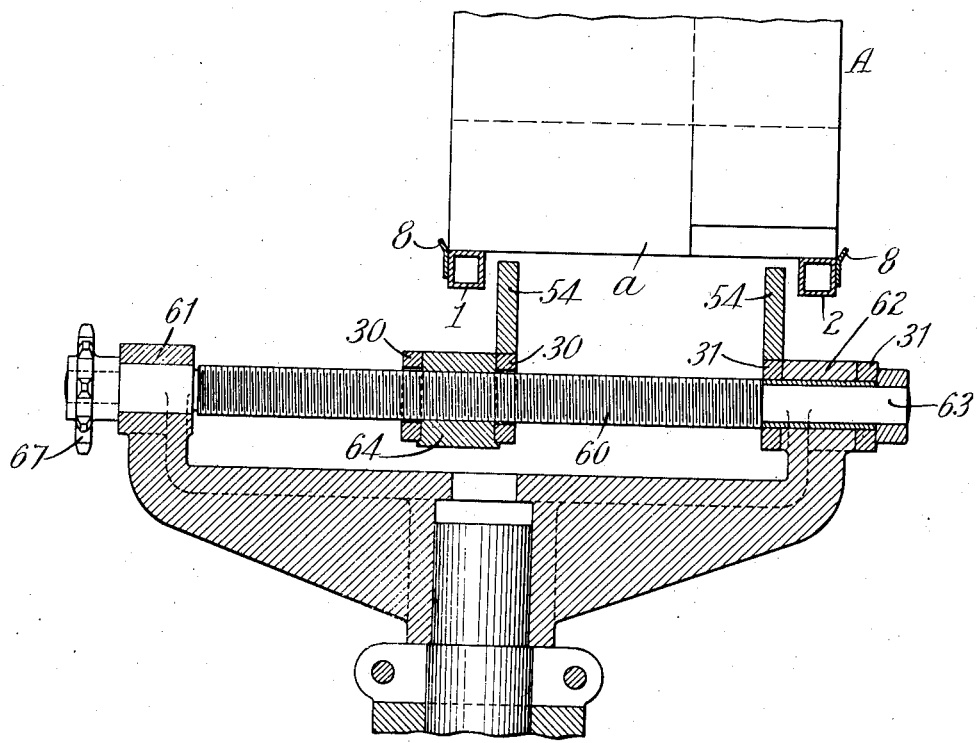
Fig. 8 is a vertical sectional detail on line 8—8 of Fig. 1 showing the feed rails and frame rails and the adjusting mechanism for spacing the frame rails for blanks of the different sizes and showing the blank as would be the case if the stack in Fig. 1 extended back beyond the section line.

Referring now to the drawings, A represents a stack of blanks (see Figs. 1, 2, 3 and 4) the individual blanks being indicated in some figures by $a$ as in Fig. 8. The stack of blanks rests on the longitudinally reciprocable rails 1, 2 which constitute a magazine or stack support and feed, the blanks being stood on end in collapsed form behind one another after the vertical filing system and with the end flaps distended.

Figure 1:
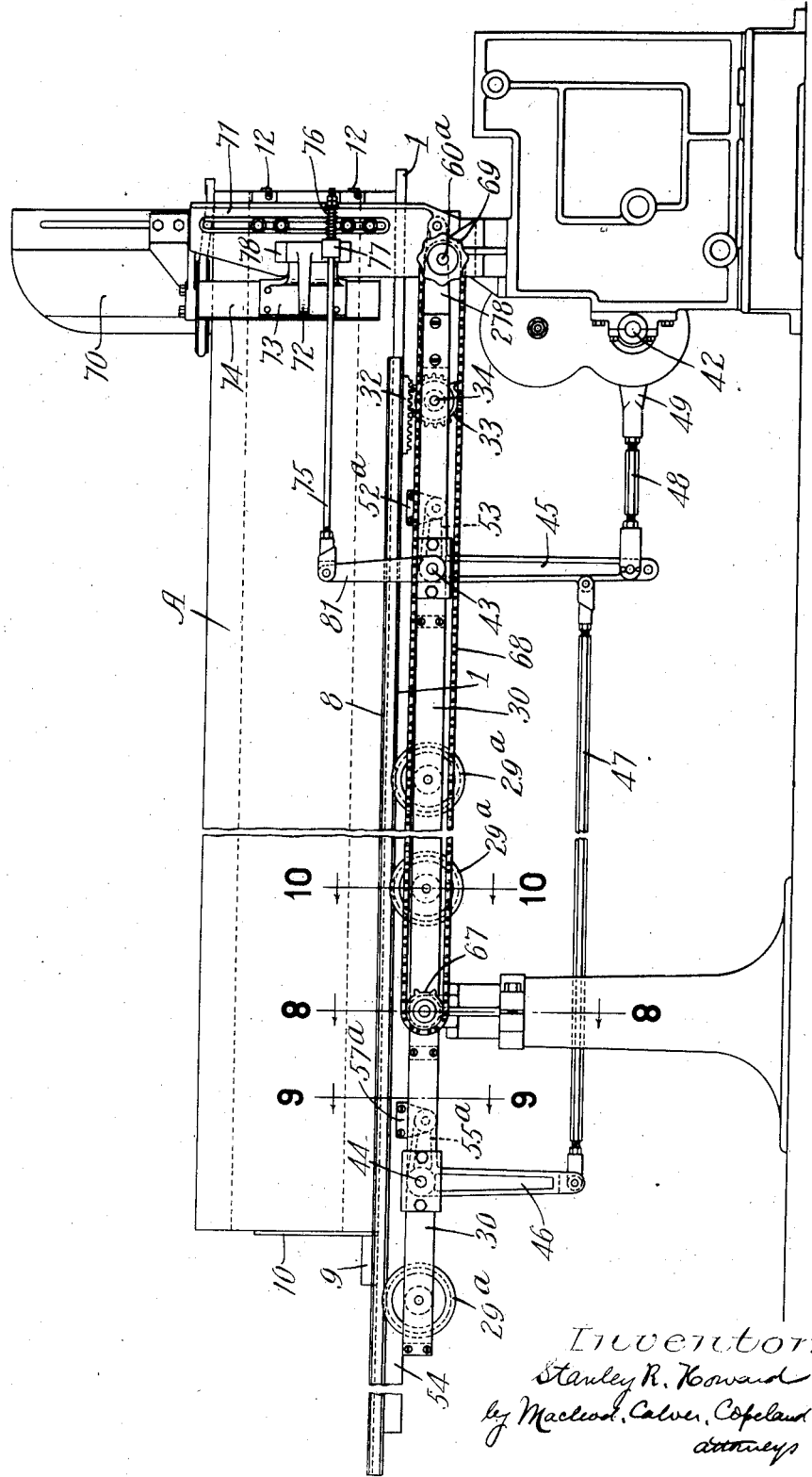

The feed rails 1, 2 are preferably made hollow as shown, for lightness. Secured to the outer side of each of the rails 1, 2 is an outwardly flaring flange 8, said flanges 8 serving as guards to hold the blanks on the rails. A weight 9 rests on the rails transversely of the stack and carries a vertical plate 10 which bears against the rearmost blank in the stack to serve as a back stop for the stack. The forward stop, see Fig. 4, consists of two members 12 and 14 which engage two opposite side edges of the foremost blank. One of said members consists of a plate 11 which extends forward from the frame at some distance higher than the feed rail 2 and has a hook 14 which reaches over the side edge 18 of the forward blank and projects a short distance on to the face of said blank, and the other of said stop members consists of a spring plate 12 which extends forward from the frame at some distance higher than the other feed rail 1 at an angle to the plane of the blank so that it not only engages the edge 19 of the blank, but also extends a little bit in front of the blank as shown in Fig. 4. This spring stop 12 has a slight yield and allows the foremost blank to be taken out of the stack at the proper time. Preferably there are at least two of these spring stop plates 12, one above the other as shown in Fig. 1.

The feed rails and operating mechanism will now be more particularly described. (See Figs. 1, 2, 3, 8, 9 and 10). The feed rails 1, 2 rest respectively on flanged rollers 29ᵃ and 29, each rail being supported on at least two rollers at different points in its length as shown in Fig. 1. The rollers which support the feed rail 1 are located between and are journaled in the frame rails 30, 30 and the rollers which support the feed rail 2 are located between and are journaled in the frame rails 31, 31. See Fig. 10. Each feed rail has attached to the bottom thereof near the forward end a rack 32 (Figs. 3 and 5) and each of these racks meshes with a gear 33 which is keyed to a horizontal shaft 34 journaled in the frame rails 30, 31.

Figure 5:
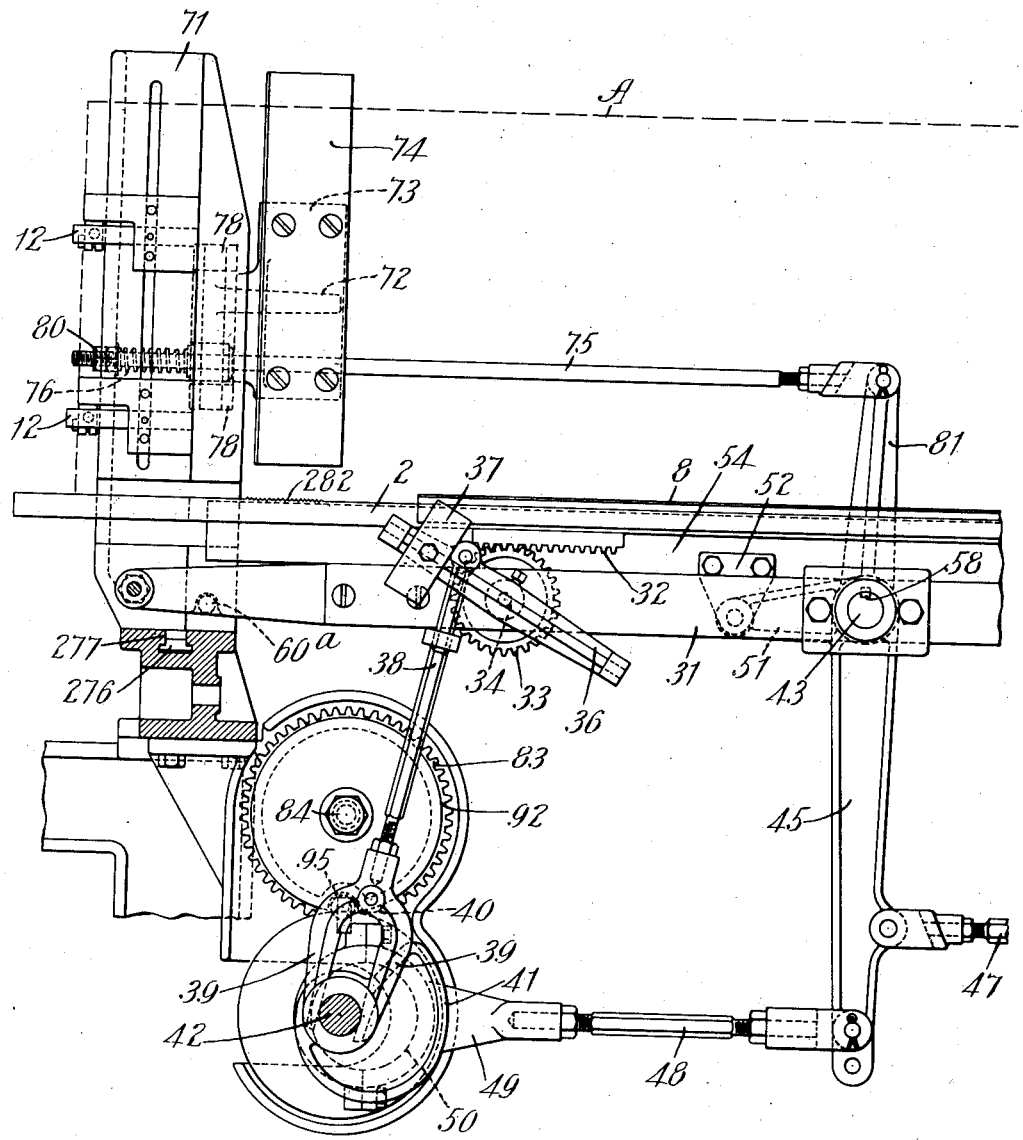
Fig. 5 is an elevation taken on the right hand side of the machine partly in section showing in detail the mechanism for operating the feed rails.

The shaft 34 which carries at its opposite ends the two gears 33 extends for some distance outside of the right hand frame rail 30 as viewed looking toward the rear from the front of the machine, and on its outer end there is mounted a lever 36 which carries a counterweight 37, see Figs. 3 and 5. This counterweight tends to rotate the shaft 34 and gears 33 in a direction to move the feed rails forward. The lever 36 is also pivotally connected to the upper end of a connecting rod 38 which extends downward and at its lower end terminates in a forked casting having two branches 39, 39. This forked casting carries a roll 40 which at certain times in the operation of the machine works in connection wtih a cam 41 which is loose on the cam shaft 42, see Figs. 3 and 5.

The cam 41 is so formed as to move the connecting rod 38 and weighted end of lever 36 upward, and move shaft 34, gear 33 and rack 32 in the reverse direction to that actuated by the weight and thereby move the feed rails 1, 2 backward at each rotation of the cam 41. The arrangement and adjustment are such that the feed rails will have a short range of movement, preferably, about three or four inches. The stack of blanks, as previously stated, rests on the top of the feed rails, standing on end, one blank behind the other in series like the vertical filing system instead of being superposed upon each other. A weight 9 resting on the feed rails carries the back stop plate 10 and may be placed by hand in position so that the plate 10 will rest against the rearmost blank in the stack. See Fig. 1. The counterweight 37 which is mounted upon one arm of the lever 36 tends to weigh down that end of the lever as shown in Fig. 5 and thereby to rotate the shaft 34 and gears 33 in a direction to move the rack 32 toward the forward end of the machine and thus to move the feed rails forward. This keeps the feed rails as far forward as permitted, the forward end of the stack pressing against the forward stop members 12 and 14 as previously described, and as often as the foremost blank is removed from the stack, the feed rails and whole stack will be moved forward a distance equal to the thickness of the space occupied by the removed blank.

The movement of the rails by means of the rack and gear connection and the shaft, lever and counterweight constitutes the entire mechanism for giving the forward feed of the blanks.

The forward feed of the guide rails by the gear and rack under actuation of the weight 37 which turns the rocker shaft 34 in one direction is not a predetermined exact distance but it depends upon the space occupied lengthwise on the rails by the predetermined number of blanks, that is, twenty-five in number in the machine illustrated in the drawings, which are withdrawn by twenty-five revolutions of the cam shaft before the rocker shaft 34 is positively rotated in a reverse direction to move the rails backward. The distance of the forward feed, therefore, depends upon the thickness of the blanks and how closely they are packed together. The weight 37 has a capacity of giving a forward feed until the weight has swung down into a plumb position unless the reverse movement is given before that time by the withdrawal of the predetermined number of blanks.

Although in the mechanism shown and described the retrograde movement of the rails takes place after a predetermined number of blanks have been taken out, the important feature is merely that the retrograde movement should occur under predetermined conditions so as to avoid a long travel. Any suitable mechanism for accomplishing this comes within the scope of the invention. It may occur after a predetermined number of blanks are removed, or after a predetermined distance of travel or predetermined interval of time, or other predetermined conditions.

Except for the friction of the lower end of the blanks on the feed rails, 1, 2 the feed rails would make a full uninterrupted forward stroke as far as the action by the counterweight 37 is able to carry them, as previously mentioned, and the rails would slide while the blanks remain stationary after the foremost blank bears against the forward stops. The friction of the blanks on the rails, however, prevents such movement of the rails when the foremost blank is engaged by the stops. There is always, however, the tendency caused by the constant pull of the weight to move the rails forward and this causes the foremost blank to press against the stops with a pressure which is always uniform due to the pull of the weight on the rocker shaft. Preferably the feed rails have for a portion of their length just back of the forward end of the lifting rails, a roughened or toothed portion 282 which serves as a friction surface to engage the lower end of some of the blanks so as to insure that the feed rail will not slide with relation to the stack on the forward movement.

After a certain number of blanks have been taken out from the forward end of the stack in the process of feeding them to the opening up mechanism, it is necessary to move the feed rails back to the original starting position in order that they may feed forward again and maintain the constant feed. The mechanism for doing this has already been described. The means for controlling the time when the retrograde movement will be given will be described hereinafter. On such retrograde movement it is necessary that the stack should be temporarily freed from the feed rails so that the feed rails will be free to move back without carrying the remaining blanks of the stack with them.

Figure 6:
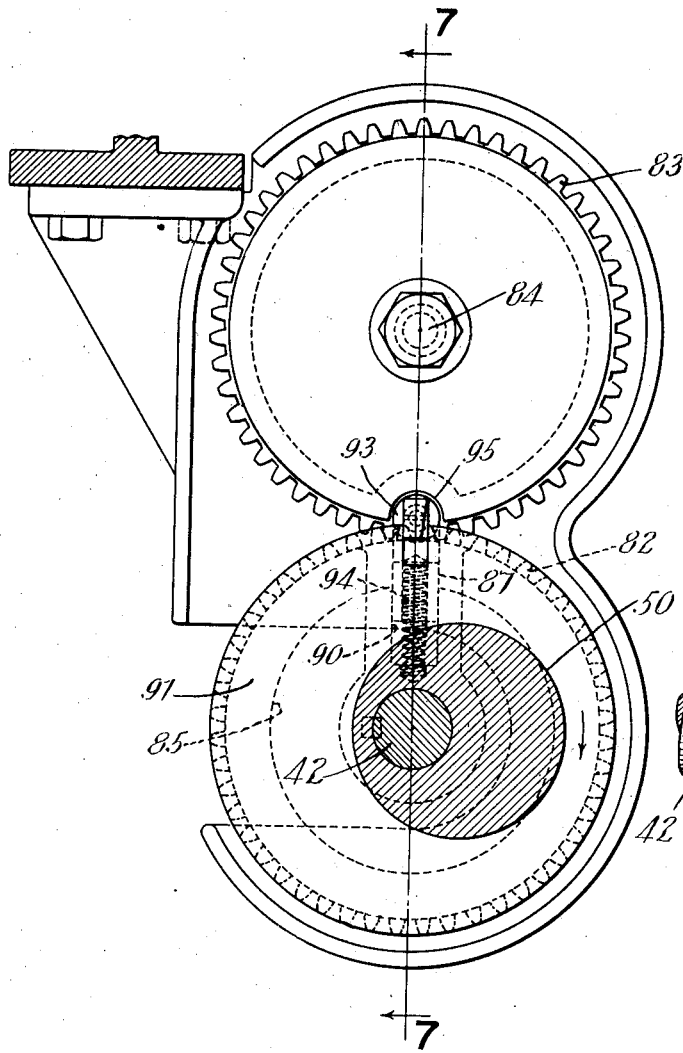
Fig. 6 is a detail view partly in section showing the clutch mechanism and gearing for operating the lifting rails of the blank support to permit the feed rails to be given a return movement.

The mechanism for lifting the blanks from the feed rails and giving this retrograde movement to the feed rails is as follows. There are journaled in the four stationary frame rails 30, 30, 31, 31, two rocker shafts 43, 44, see Figs. 1 and 5, one of said rocker shafts being toward the forward end of the feed rails and the other toward the rear end of the feed rails. These shafts 43, 44 extend across beneath the feed rails. Mounted on said rocker shafts respectively so as to move therewith are the levers 45 and 46, each of said levers having an arm which extends downwardly, said arms being both connected with a connecting rod 47. The point of connection of the rod 47 with the lever 45 is the same distance from the rocker shaft 43 that the point of connection of the rod 47 with the lever 46 is from the rocker shaft 44. The downward arm of lever 45 has an extension below the point of connection with the rod 47. The lower end of said lever 45 is pivotally connected with one end of a connecting rod 48, the other end of said connecting rod 48 being attached to an eccentric strap 49 which is operated by an eccentric 50 mounted loosely on the cam shaft 42, see Figs. 1, 2, 3 and 5. The eccentric 50 is operated through a clutch mechanism which allows the eccentric to rotate with the cam-shaft once for each predetermined number of revolutions of the cam shaft, for instance, in the machine shown in the drawings once for every twenty-five revolutions of the shaft. See Figs. 6 and 7. The mechanism by which this is accomplished will be described hereinafter. At each revolution of the cam shaft one blank is removed from the stack so that the backward movement of the feed rails occurs after twenty-five blanks have been removed.

The lever 45 is a bell crank lever having a horizontal arm 51 which lies behind the right hand frame rails 31, 31 and is pivotally connected to a bracket 52 made fast to the right hand lifting rail 54, see Fig. 5. Mounted on the rocker shaft 43 is another horizontal arm 53 (see Fig. 1) which lies between the frame rails 30, 30 and is pivoted to an upwardly extending bracket 52ª made fast to the left hand lifting rail 54.

Figure 9:
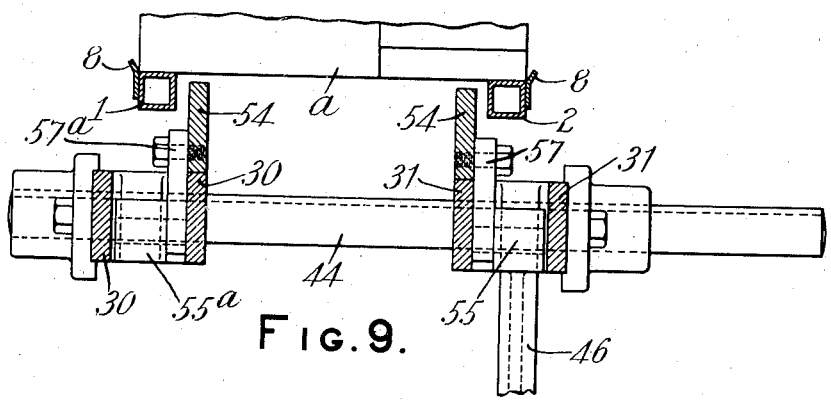
Fig. 9 is a section on line 9—9 of Fig. 1, assuming the stack of blanks to extend back of the section line.
Figure 10:
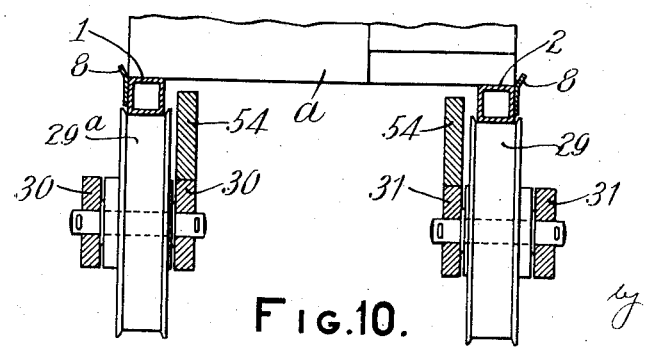
Fig. 10 is a section on line 10—10 of Fig. 1, assuming the stack of blanks to extend back of the section line.

Mounted on the shaft 44 to which the lever 46 is connected are two horizontal arms 55, 55ª (see Figs. 1 and 9). Arm 55 lies between the right hand frame rails 31, 31 and is pivoted to a bracket 57 made fast to the right hand lifting rail 54. Arm 55ª lies between the left hand frame rails 30, 30 and is pivoted to a bracket 57ª made fast to the left hand lifting rail 54. These lifting rails, see Figs. 8, 9 and 10, normally rest upon the top of the frame rails 30, 31, respectively and are between the feed rails 1, 2. When the downwardly hanging levers 45, 46 are moved by means of the eccentric 50 previously described, the two rocker shafts 43 and 44 are rotated equally and together and the forward ends of the horizontal arms 51, 53, 55 and 55ª are moved vertically upward and carry with them in a vertical direction the two lifting rails 54, 54.

The lifting rails 54 are moved upward until the top of each rail comes in contact with the bottom of the stack of cartons A, and then they move still farther upward until they raise the complete stack together with the weight 9 and back rest 10 sufficiently to remove the stack and the weight from the movable feed rails.

When the feed rails have been lifted, the cam 41 which is mounted on the shaft 42 and rotates in direct connection with the eccentric 50 (see Figs. 3 and 7) comes into contact with the roll 40 mounted on the fork of the connecting rod 38, and the action of said cam on the cam roll 40 is such as to actuate the connecting rod 38 in a manner to rock the shaft 34 in the opposite direction to that in which the counterweight 37 has a tendency to move by it, and by this reverse action the gears 33 are rotated in a direction to move the racks 32 and feed rails 1, 2 backward into their rearmost position and the feed rails are held in that position until the eccentric has turned far enough to have lowered the lifting rails and permitted the stack of blanks and the weight 9 to be deposited again on the movable feed rails. This leaves the stack of blanks in exactly the same position relative to the forward end of the machine as before the feed rails were moved backward. It is obvious that if instead of lifting the stack from the feed rails before the retrograde movement, the feed rails were lowered, depositing the stack on stationary supporting rails leaving the feed rails free to move back and then rise again to receive the stack, such construction would be an equivalent of the mechanism shown and already described.

In order to allow for carton blanks of different width one whole side of the lifting and feeding mechanism including one of the movable feed rails, one of the lifting rails and one pair of the frame rails, is adjustable toward and from the opposite side so as to vary the space between the feed rails and between the lifting rails. In the machine shown in the drawings, the movable members are those which are located on the left hand side facing the machine from the front, that is, on the left hand side as viewed in Figs. 8, 9 and 10 and right hand side as viewed in Fig. 3. All of the connections and mechanism pertaining to the adjustable feed rail and lifting rail are carried between the two pairs of frame rails so that when one pair of frame rails is adjusted toward or from the other pair of frame rails, all of the mechanism will go with it.

The bell crank lever 45 and the lever 46 are mounted on their respective rocker shafts 43 and 44 by means of feather keys 58 (see Fig. 5) which permit the rocker shafts to slide axially through the levers without interfering with the operative connection of the rocker shaft with the levers.

The horizontal arms 53 and 55ᵃ are fast to the rocker shafts, and the movement of these parts is all governed by the movement of the frame rails 30, 30. A feed screw 60 is journaled at its opposite ends in bearings 61, 62 in a bracket forming a part of the frame of the machine, one end of the feed screw having a smooth bearing portion 63 which passes through the fixed frame rails 31, 31 on either side of the bearing 62, the threaded portion of the screw passing through the frame rails 30, 30 and through a nut 64 which is between the two frame rails 30, 30.

In order to insure an even movement of the movable feed rails and the connected parts just above described, it is important that there should be at least two adjusting screws located at different points in the length of the feed rails. The adjusting screw 60 already described is located at a considerable distance toward the rear end of the feed rails. A second adjusting screw 60ᵃ has a smooth portion which is journaled in a bracket 65 on the left hand side of the machine, nearer the forward end of the feed rails, it being on the right in rear elevation as viewed in Fig. 3. The threaded portion of said adjusting screw passes through the lug 64ᵃ on the bracket 71. The bracket 71 has on its lower part a tongue 276 which is slidable in a transverse groove 277 in the frame so that said bracket is slidable transversely toward and away from the bracket 70. An arm 278 fast to the bracket 71 is also fast to the frame rails 30.

By turning the screw 60ᵃ in unison with the screw 60, the bracket 71 is moved one way or the other with the frame rails 30. See Figs. 3 and 5. The inner end of the screw 60ᵃ, does not extend into engagement with the frame rails 31. Mounted on the screw 60ᵃ is a sprocket wheel 66, and mounted on the screw 60 is a sprocket wheel 67. A sprocket chain 68 runs over the said sprocket 66 and 67. The screw 60ᵃ is provided with a hand wheel 69 at its outer end whereby the screw 60ᵃ may be rotated and thereby through the sprockets 66 and 67 and chain 68 the feed screw 60 is also simultaneously rotated. In so doing the frame rails 30, 30 will be moved toward or from the frame rails 31, 31 according to which way the screws are turned, the two frame rails 30, 30 being tied together. Thus the frame rails 30, 30 may be moved toward or from the fixed frame rails 31, 31 as desired and carry with them the interposed brackets 52ᵃ and 54ᵃ and the horizontal lever arms 53 and 55ᵃ and the movable lifting rail 54 which is attached to the brackets 52ᵃ and 57ᵃ. The frame rails 30, 30 will also carry with them the flanged rollers 29ᵃ which lie between the frame rails 30, 30. As the feed rail 1 lies between the flanges of the rollers 29ᵃ, the said feed rail 1 will be moved laterally. The movement of all of the above parts will be as one member.

There is also provided means for alining the stack of blanks on the feed rails up against the inside face of the bracket 70 which rises up at the side of the stack near the forward part of the feed mechanism on the right hand side as viewed facing from the front of the machine, see Figs. 1, 3 and 5. Pivotally mounted in bearings 78 on the bracket 71 on the opposite side of the machine is a bell crank arm 72. One arm of this bell crank is formed with a flat surface 73 at its end to which is attached a steel plate 74 which stands in a vertical position and which is normally held slightly away from the edge of the stack by a connecting rod 75 which passes through an aperture in a boss 77 in the outer end of the horizontal arm of the bell crank 73, see Figs. 1, 2 and 5.

A spring 76 is coiled around the connecting rod 75, one end of said spring abutting against the boss 77, and the other end of the spring abutting against a washer 79 which is held in place by a nut 80 screwed on to the threaded end of the connecting rod 75. The spring 76 is under tension and normally tends to hold the connecting rod and the bell crank 72 in such position as to hold the plate 74 away from the edge of the stack of blanks. The connecting rod 75 is pivotally connected at its other end to the upper end of a vertical arm 81 whose lower end is made fast to the rocker shaft 43, see Figs. 1 and 5. The turning of the rocker shaft 43 when the shafts 43 and 44 rock in a direction to raise the lifting rails 54 will actuate said vertical arm 81 and connecting rod 75 in a direction to move the bell crank lever 72 to bring the steel plate 74 toward the stack, and push the blanks up against the face of the bracket 70. The connecting rod 75 has slightly more movement than is required to move the blanks up against the face of the bracket 70 and the extra amount of movement is taken up by means of the spring 76 on the connecting rod so that the plate 74 is brought up against the stack of blanks with a spring tension. When the rocker shafts 43 and 44 turn in the reverse direction to lower the lifting rails so that the stack of blanks is redeposited on the feed rails, the connecting rod 75 is moved in the reverse direction and thereby causes the steel plate 74 to be retracted from contact with the blanks so not to afford frictional resistance to the feeding of the blanks when the feed rails move forward.

As was previously stated, the feed rails after moving forward a predetermined distance are moved backward. The mechanism for controlling the periodic movement of the feed rails forward and back will now be described, see Figs. 5, 6 and 7. In the mechanism shown the machine is adapted to give the reverse movement at the end of twenty-five revolutions of the cam shaft 42, that is, after twenty-five blanks have been removed from the stack.

Figure 7:
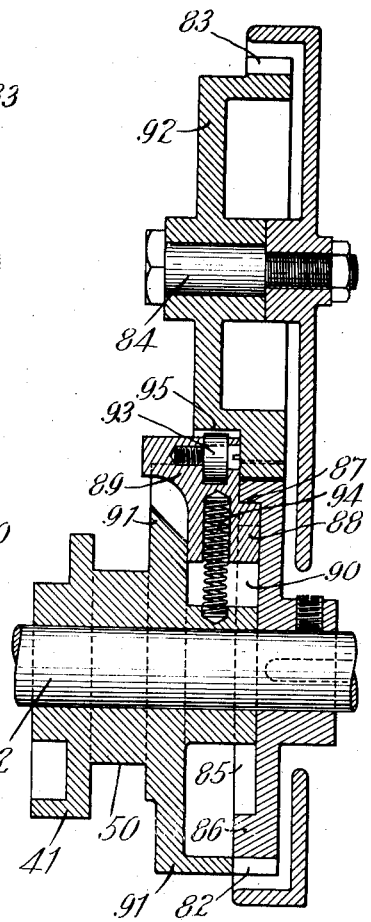
Fig. 7 is a section on line 7—7 of Fig. 6.

Mounted on the cam shaft 42 is a gear 82 which meshes with a gear 83 mounted loosely on a stud 84 carried on a part of the frame of the machine. The gear 82 is formed on one side with a circular recess 85 circumscribed by an annular flange 86 which forms a part of the rim of the gear. The said flange 86 is formed with a notch 87 in its inner periphery with which at a certain time a tooth 88 of a clutch dog 89 is adapted to engage. In Fig. 7 said dog is shown in engagement with said notch. This dog is carried in a slot 90 in a disk 91 which is mounted loose on the cam shaft 42.

The gear 83 is formed with an outside flanged rim 92 which is of sufficient diameter to engage with a roll 93 carried by the clutch dog 89 and thereby hold the tooth of the clutch dog out of engagement with the notch 87 in the driving gear 82. In Fig. 7 the dog is shown as being engaged with the notch 87 in the driving gear. The disk 91 is combined with the eccentric 52 and with the cam 41 which operates the lifting mechanism of the feed rails, see Figs. 3, 5, 6 and 7.

The dog 89 is provided with a spring 94 which has a seat in the hub of the disk 91 and which tends to force the dog outward into engagement with the notch 87 in the driving gear unless the dog is held back with the spring under compression. The rim 92 of the driven gear is formed at one point with a notch 95 adapted to fit the roll 93 carried by the dog, said notch being of such size that when the notch 95 comes into alinement with the clutch dog as shown in Fig. 7, it will allow the spring 94 to push the dog outward from the shaft 42 and cause the tooth 88 of the clutch dog to engage with the notch 87 in the driving gear 82. At this time the roll 93 will just fit in the notch 95 in the rim of the driven gear. When this last mentioned notch 95 comes into alinement with the roll 93 of the dog and allows the tooth 88 of the dog to engage with the notch 87 in the driving gear the disk 91 which carries the eccentric 50 and the cam 41 will be rotated directly with the driven gear by means of this clutch engagement.

The number of teeth in the two gears 82 and 83 is not equal. In this particular case the driving gear 82 has two less teeth than the driven gear 83, the gear 82 having forty-eight teeth and the gear 83 having fifty teeth. This causes the gears to rotate unequally so that starting with the gears in the position shown in Figs. 6 and 7, with the dog 88 in engagement with the notch 87 of the driving gear and the roll 93 in the notch 95 of the driven gear, then when the clutch disk 91 makes one complete rotation the notch 95 in the rim of the driven gear will not aline with the clutch dog but will be a distance of two teeth away from it. This will bring the rim 92 of the driven gear 83 into engagement with the clutch dog 89 and will depress it into the recess 90, thereby also compressing the spring 94, and thus disengage the clutch. The rotation of the eccentric 50 and cam 41 will then cease until a sufficient number of rotations of the cam shaft have taken place to bring the recess 95 in the driven gear 83 again into alinement with the clutch dog. In this particular form of construction twenty-five rotations will be required because there are two teeth gained at each rotation and there are fifty teeth in all to be gained.

The cam shaft 42 is driven through a gear 206 which is mounted fast on said cam shaft 42 and engages with a pinion 207 on the main driving shaft 208.

While the reciprocable magazine or stack support has been shown as composed of parallel rails, that being the preferred form of construction, it is not intended to have the claims limited to a support made of rails. It is to be understood that any other suitable form of reciprocable support may be employed and still be within the scope of this invention.

What I claim is:

1. A reciprocable bottom support for a stack of blanks, means for moving the support with the stack bodily forward by successive movements, a step farther forward being taken after each removal of a blank until the support and stack have accomplished a total predetermined forward movement, means for automatically moving the support backward to its initial position after said predetermined total forward movement, means for retaining the remaining portion of the stack in its advanced position during the retrograde movement of the support, and means for automatically redepositing the stack in its advanced position on the support at the end of the retrograde movement.

2. A reciprocable bottom support for a plurality of blanks, means for reciprocating said support, means whereby the withdrawal of a blank controls the forward movement of the support, means for temporarily relieving the pressure of the stack on the bottom support after a predetermined forward feed, and means for moving the support backward after the pressure of the blanks on the support has been relieved.

3. A reciprocable support for a stack of blanks arranged one behind the other on the support, means for reciprocating said support, means whereby the withdrawal of the foremost blank controls the forward movement of the support a sufficient distance to bring the next following blank to a predetermined position, means for freeing the said support temporarily from the pressure of the stack after a predetermined forward feed, means for moving the support backward after it is freed from pressure of the stack, and means for controlling the extent of forward feed and for rendering operative the mechanism for relieving the support from the pressure of the stack and the mechanism for moving the support backward.

4. A machine for feeding blanks having a reciprocable magazine on which a plurality of blanks are supported, means for automatically moving the magazine forward a predetermined distance, means for relieving the supporting magazine from the pressure of the blanks at the end of the predetermined forward movement of the magazine, means for automatically moving the magazine backward after it has been relieved from the pressure of the mass of blanks, and means for redepositing the mass of blanks upon the magazine at the end of the retrograde movement.

5. A machine for feeding blanks having a reciprocable magazine on which a plurality of blanks are supported, means for automatically moving the magazine forward a predetermined distance, means for relieving the supporting magazine from the pressure of the blanks at the end of the predetermined forward movement of the magazine, means for automatically moving the magazine backward after it has been relieved from the pressure of the mass of blanks, means for redepositing the mass of blanks upon the magazine at the end of the retrograde movement, and means for automatically controlling the sequence and time of movement of the said magazine and the mechanism for relieving the pressure of the blanks on the magazine.

6. A machine for feeding blanks having longitudinally reciprocable rails on which a stack of blanks are supported, means for separating the stack of blanks from the supporting rails at the end of a predetermined forward movement of the rails, means for moving the rails backward after the stack of blanks have been separated therefrom, and means for redepositing the stack of blanks upon the rails at the end of the retrograde movement.

7. A machine for feeding blanks having longitudinally reciprocable rails on which a stack of blanks are supported, means for separating the stack of blanks from the supporting rails at the end of a predetermined forward movement of the rails, means for moving the rails backward after the stack of blanks have been separated therefrom, means for redepositing the stack of blanks upon the rails at the end of the retrograde movement, and means for controlling the sequence of movement of said reciprocable rails and said separating mechanism.

8. A reciprocable bottom support for supporting and feeding blanks, mechanism for moving said support in a forward direction a predetermined distance to feed a stack of blanks mounted thereon, stop mechanism adapted to be engaged by the foremost blank in the stack on the support which together with the friction of the blanks on the support normally restrains the feed movement, said actuating mechanism being operative each time the foremost blank is withdrawn to move the blank support and stack forward a distance to bring the next foremost blank against the stop thus giving the support and stack a step by step movement until a sufficient number of blanks have been withdrawn so that the blank support shall have moved forward the predetermined distance, and means whereby said support is given a retrograde movement after a predetermined number of blanks have been withdrawn from the stack.

9. A machine for feeding blanks having two parallel longitudinally reciprocable rails to support and feed a stack of blanks, a pair of parallel lifting rails which are normally below the stack when the stack is seated upon the feed rails, means for moving the feed rails to feed the stack forward, means for moving the said feed rails backward after a predetermined forward movement, and means for raising the said lifting rails to lift the stack bodily from the feed rails.

10. A machine for feeding blanks having two parallel longitudinally reciprocable rails to support and feed a stack of blanks, a pair of parallel lifting rails which are normally below the stack when the stack is seated upon the feed rails, means for moving the feed rails to feed the stack forward, means for moving the said feed rails backward after a predetermined forward movement, means for raising the said lifting rails to lift the stack bodily from the feed rails, and means for controlling the lifting movement so that it will take place after a predetermined forward movement of the feed rails and before the retrograde movement thereof.

11. A machine for feeding blanks having two parallel longitudinally reciprocable rails to support and feed a stack of blanks, a pair of parallel lifting rails which are normally below the stack when the stack is seated upon the feed rails, means for moving the feed rails to feed the stack forward, means for moving the said feed rails backward after a predetermined forward movement, means for raising the said lifting rails to lift the stack bodily from the feed rails, means for controlling the lifting movement so that it will take place after a predetermined forward movement of the feed rails and before the retrograde movement thereof, and means for adjusting one of the feed rails and one of the lifting rails with relation to the companion feed and lifting rails to vary the distance between the feed rails and the distance between the lifting rails.

12. A reciprocable support on which blanks may be supported on edge in series one behind the other face to face, a stop which engages the foremost blank on the support and means for moving said support bodily in a direction toward the said stop in such manner that the foremost blank is held by a slight pressure against said stop, the forward actuating force for the support being sufficient to move the support bodily forward each time a blank is removed until the then foremost blank on the support is brought into contact with said stop.

13. A reciprocable support on which blanks may be supported on edge in series one behind the other face to face, a stop which engages the foremost blank on the support, and means for moving said support bodily in a direction toward the said stop in such manner that the foremost blank is held by a slight pressure against said stop, the force which tends to move the support forward being less than sufficient to overcome the resistance due to the friction of the blank on the support when the forward blank is engaged by the stop, the forward actuating force for the support being sufficient to move the support bodily forward each time a blank is removed until the then foremost blank on the support is brought into contact with said stop.

14. A reciprocable support on which a stack of blanks may be supported on edge face to face one behind another, stop mechanism which engages the foremost blank on the support, means for moving said support in a direction toward said stop in such manner that the foremost blank is held by a slight pressure against said stop, the forward actuating force for the support being sufficient to move the support forward each time a blank is moved until the then foremost blank on the support is brought into contact with said stop, said force not being sufficient to overcome the resistance due to the friction of the blanks on the support when the forward blank is engaged by the stop, and means controlled by the withdrawal of a predetermined number of blanks from the support to free the remaining blanks in the stack from contact with said support.

15. A reciprocable support on which a stack of blanks may be supported on edge face to face one behind another, stop mechanism which engages the foremost blank on the support, means for moving said support in a direction toward said stop in such manner that the foremost blank is held by a slight pressure against said stop, the forward actuating force for the support being sufficient to move the support forward each time a blank is moved until the then foremost blank on the support is brought into contact with said stop, means controlled by the withdrawal of a predetermined number of blanks from the support to free the remaining blanks in the stack from contact with said support, and means controlled by the said freeing mechanism to cause a retrograde movement of the support when the blanks are freed from the support.

16. A reciprocable support on which a stack of blanks may be supported on edge face to face one behind another, a stationary rigid stop which hooks over one edge of the foremost blank of the stack on to the front face thereof, a yielding stop which engages over the edge of the foremost blank on the opposite side from that which is engaged by the said stop, and means for moving said support bodily forward to always maintain the foremost blank by a slight pressure against said stops, the forward actuating force for the support being sufficient to move the support forward each time a blank is removed until the then foremost blank is brought into contact with said stops, said force not being sufficient to overcome the resistance of said yielding stop.

17. A reciprocable bottom support for supporting and feeding blanks, a rotary member having intermediate connections actuated by a weighted lever for moving said support in a forward direction a predetermined distance to feed a stack of blanks mounted thereon, stop mechanism adapted to be engaged by the foremost blank in the stack on the support which together with the friction of the blanks on the support normally restrains the feed movement, said actuating mechanism being operative each time the foremost blank is withdrawn to move the blank support and stack forward a distance to bring the next foremost blank against the stop thus giving the support and stack a step by step movement until a sufficient number of blanks have been withdrawn so that the blank support shall have moved forward the predetermined distance, and means whereby said support is given a retrograde movement after a predetermined number of blanks have been withdrawn from the stack.

18. A reciprocable bottom support for supporting and feeding a stack of blanks, a rocker member having intermediate connections for moving said support in a forward direction a predetermined distance carrying with it a stack of blanks mounted thereon, stop mechanism adapted to be engaged by the foremost blank in the stack on the support, said actuating mechanism being operative each time after the foremost blank is withdrawn to move the blank support and stack forward a distance to bring the next foremost blank against the stop thus giving the support and stack a step by step movement until a sufficient number of blanks have been withdrawn so that the blank support shall have moved forward the predetermined distance, and means whereby said support is given a retrograde movement after a predetermined number of blanks have been withdrawn from the stack, said retrograde actuating mechanism comprising a rotary shaft, a cam on said shaft and means whereby the cam at each rotation thereof actuates the said rocker member to rotate in a reverse direction and give a retrograde movement to the blank support.

19. A reciprocable bottom support for supporting and feeding a stack of blanks, a rotary member having intermediate connections actuated by a weighted lever for moving said support in a forward direction a predetermined distance carrying with it a stack of blanks mounted thereon, stop mechanism adapted to be engaged by the foremost blank in the stack on the support which together with the friction of the blanks on the support normally restrains the feed movement, said actuating mechanism being operative each time after the foremost blank is withdrawn to move the blank support and stack forward a distance to bring the next foremost blank against the stop thus giving the support and stack a step by step movement until a sufficient number of blanks have been withdrawn so that the blank support shall have moved forward the predetermined distance, and means whereby said support is given a retrograde movement after a predetermined number of blanks have been withdrawn from the stack, said retrograde actuating mechanism comprising a connecting rod pivotally connected with said weighted lever, a rotary shaft, a cam on said shaft and means whereby the cam at each rotation thereof actuates the said connecting rod to turn backward the said rotary member which actuates the blank support and gives a retrograde movement to the blank support.

20. A machine for feeding blank sheets having in combination a support to hold a stack of sheets arranged one behind the other face to face and standing on edge on said support, means for moving the blank support forward each time a blank is removed a distance sufficient to bring the then foremost blank to a predetermined position, means for freeing the remaining blanks in the stack from the support after a predetermined number of blanks have been removed, means for giving a retrograde movement to the support after the blanks have been freed, means for causing the redepositing of the freed blanks upon the support, a stationary side edge guard for the blanks on one side, a movable guard on the opposite side of the support, and means for actuating said movable guard to engage the edges of the blanks in the stack and press the stack against the said fixed side guard during the retrograde movement of the bottom support.

21. A machine for feeding flat blanks having a bottom support on which a stack of blanks may be supported, means for moving the said support with the stack of blanks bodily forward by successive movements as the blanks are withdrawn one by one from the stack, means for moving the support backward after a predetermined forward movement, means for lifting the stack of blanks from the said support at the end of the forward movement and before the retrograde movement and holding them lifted during said retrograde movement of the bottom support, means for redepositing the stack on said bottom support at the end of the retrograde movement, and means for retaining the blanks in the stack in alinement with each other during the lifting and replacing movement of the stack.

22. A machine for feeding flat blanks having a bottom support on which a stack of blanks may be supported, means for moving the said support with the stack of blanks bodily forward by successive movements as the blanks are withdrawn one by one from the stack, means for moving the support backward after a predetermined forward movement, means for lifting the stack of blanks from the said support at the end of the forward movement and before the retrograde movement and holding them lifted during said retrograde movement of the bottom support, side guides to retain said blanks in alinement with each other during the lifting and lowering of the stack, one of said guides being fixed and the other being movable toward the fixed guide to push the blanks up into engagement with the said fixed guide and hold them in such engagement during the up and down movement of the stack and being movable away from the stack when the stack is redeposited on the bottom support, means for actuating said movable guide, and means for controlling the sequence of movements of the stack lifter and the movable guide.

23. A machine for feeding flat blanks having a bottom support on which a stack of blanks may be supported, means for moving the said support with the stack of blanks bodily forward by successive movements as the blanks are withdrawn one by one from the stack, means for moving the support backward after a predetermined forward movement, means for lifting the stack of blanks from the said support at the end of the forward movement and before the retrograde movement and holding them lifted during said retrograde movement of the bottom support, side guides to retain said blanks in alinement with each other during the lifting and lowering of the stack, one of said guides being fixed and the other being movable toward the fixed guide to push the blanks up into engagement with the said fixed guide and hold them in such engagement during the up and down movement of the stack, the movable guide being under yielding pressure against the stack.

24. A machine for feeding flat blanks having a bottom support on which a stack of blanks may be supported, means for moving the said support with the stack of blanks bodily forward by successive movements as the blanks are withdrawn one by one from the stack, means for moving the support backward after a predetermined forward movement, means for lifting the stack of blanks from the said support at the end of the forward movement and before the retrograde movement and holding them lifted during said retrograde movement of the bottom support, side guides to retain said blanks in alinement with each other during the lifting and lowering of the stack, one of said guides being fixed and the other being movable toward the fixed guide to push the blanks up into engagement with the said fixed guide and hold them in such engagement during the up and down movement of the stack and being movable away from the stack when the stack is redeposited on the bottom support, said movable guide comprising a movable rod having a presser plate mounted thereon, and means for reciprocating said rod controlled by the raising and lowering mechanism for the stack to actuate the said movable guide, said rod on which the movable guide is mounted being spring seated and having a range of movement which causes the presser plate to engage the stack with a yielding pressure.

25. A machine for feeding flat blanks having a bottom support on which a stack of blanks may be supported, means for moving the said support with the stack of blanks bodily forward by successive movements as the blanks are withdrawn one by one from the stack, means for moving the support backward after a predetermined forward movement, means for lifting the stack of blanks from the said support at the end of the forward movement and before the retrograde movement and holding them lifted during said retrograde movement of the bottom support, side guides to retain said blanks in alinement with each other during the lifting and lowering of the stack, one of said guides being fixed and the other being movable toward the fixed guide to push the blanks up into engagement with the said fixed guide and hold them in such engagement during the up and down movement of the stack and being movable away from the stack when the stack is redeposited on the bottom support, said movable guide comprising a longitudinally reciprocable rod, a presser plate having a pivoted bell crank arm, a longitudinally reciprocable rod passing loosely through said arm, a coil spring surrounding said rod near one end, one end of said spring having an abutment on said arm, the other end abutting against a stop on said rod, means connected with the opposite end of said rod controlled by the raising and lowering mechanism for the stack to reciprocate said rod and rock said bell crank to move the presser plate toward and from the stack, said spring serving as a take-up for surplus movement of the rod after the presser plate engages with the stack.

26. A reciprocable carriage for a stack of blanks, means for actuating the said carriage in a forward direction a predetermined distance, a stop with which the foremost blank of the stack engages to normally restrain the advance movement, the withdrawal of the foremost blank of the stack permitting the carriage to be moved forward far enough to bring the next foremost blank into engagement with the stop, and mechanism for giving a retrograde movement to the carriage, said retrograde actuating mechanism comprising a driving shaft and intermediate mechanism including a cam loose on said shaft for actuating said retrograde movement, clutch mechanism for engaging the driving shaft with relation to the retrograde mechanism, and means whereby the clutch is engaged after a predetermined number of revolutions of the driving shaft, and means for again disengaging the clutch.

27. A reciprocable carriage for feeding a stack of blanks, means for moving the carriage forward a predetermined distance and means for giving the carriage a retrograde movement said retrograde mechanism comprising a driving shaft, a gear mounted fast on said driving shaft, intermediate mechanism between said driving gear and the carriage to actuate the carriage rearwardly, said intermediate mechanism being normally disengaged from driving connection, clutch mechanism for connecting the driving gear with the said intermediate mechanism, a second shaft having thereon a gear which intermeshes with said driving gear, one of said gears being formed with a greater number of teeth than the other, and means controlled by said gears whereby the clutch is engaged and disengaged once for each predetermined number of revolutions of the driving gear, said number of revolutions being determined by the ratio of the number of teeth on the driving gear to the number of teeth on the driven gear.

28. A reciprocable carriage for a stack of blanks, means for actuating the said carriage in a forward direction a predetermined distance, a stop with which the foremost blank of the stack engages to normally restrain the advance movement, the withdrawal of the foremost blank of the stack permitting the carriage to be moved forward far enough to bring the next foremost blank into engagement with the stop, mechanism for giving a retrograde movement to the carriage, a driving shaft and intermediate mechanism including a cam loose on said shaft for actuating said retrograde movement, clutch mechanism for engaging the driving shaft with relation to the retrograde mechanism, and means whereby the clutch is engaged after a predetermined number of revolutions of the driving shaft and means for again disengaging the clutch, said clutch mechanism comprising two intermeshing gears with an unequal number of teeth, one of said gears being fast on said driving shaft and driving the other gear, and a spring actuated dog carried by a member which is fast to the cam and loose on said driving shaft, the driving gear being formed with a notch with which a tooth on said dog is adapted to engage to make driving connection with said cam, the driven gear being formed with a portion which normally engages with said dog to restrain it from engagement with the driving gear, said restraining portion being formed with a recess which comes into alinement with the dog simultaneously with the alinement of the tooth on the dog with the notch in the driving gear once for each predetermined number of revolutions of the driving gear, determined by the ratio of the number of teeth on the driving gear to the number of teeth on the driven gear, thereby causing a release of the restraint upon said dog.

29. A reciprocable bottom support for supporting and feeding a stack of blanks, a rocker member having intermediate connections for moving said support in a forward direction a predetermined distance carrying with it a stack of blanks mounted thereon, stop mechanism adapted to be engaged by the foremost blank in the stack on the support, said actuating mechanism being operative each time after the foremost blank is withdrawn to move the blank support and stack forward a distance to bring the next foremost blank against the stop thus giving to the support and stack a step by step movement until a sufficient number of blanks have been withdrawn so that the blank support shall have moved forward the predetermined distance, and means whereby said support is given a retrograde movement after a predetermined number of blanks have been withdrawn from the stack, said retrograde actuating mechanism comprising a rotary driving shaft, a cam on said shaft and means whereby the cam at each rotation of the cam actuates the said rocker member to rotate in a reverse direction to its forward feed movement and give a retrograde movement to the blank support.

30. A reciprocable bottom support for supporting and feeding a stack of blanks, a rocker member having intermediate connections for moving said support in a forward direction a predetermined distance carrying with it a stack of blanks mounted thereon, stop mechanism adapted to be engaged by the foremost blank in the stack on the support, said actuating mechanism being operative each time after the foremost blank is withdrawn to move the blank support and stack forward a distance to bring the next foremost blank against the stop thus giving to the support and stack a step by step movement until a sufficient number of blanks have been withdrawn so that the blank support shall have moved forward the predetermined distance, means whereby said support is given a retrograde movement after a predetermined number of blanks have been withdrawn from the stack, said retrograde actuating mechanism comprising a rotary driving shaft, a cam on said shaft and means whereby the cam at each rotation of the cam actuates the said rocker member to rotate in a reverse direction to its forward feed movement and give a retrograde movement to the blank support, and means for controlling the time with relation to the forward movement when the retrograde movement shall begin comprising a disk combined with said cam, both loose on said shaft, said disk having a flange with a socket recess and a spring seated dog mounted therein, a spur gear fast on said shaft having a flange with a notch therein, said dog having a tooth which at certain predetermined times engages in said notch thereby causing the disk and cam to rotate with said driving shaft, a rotary driven gear which engages with the gear on said driving shaft, said dog having a roll at its outer end, said driven gear having a flange which engages said roll and normally holds the dog depressed in its socket, and thereby out of engagement with the driving gear, the flange of the driven gear having a notch with which the said roll is adapted to engage, the spring on which said dog is seated causing the said roll to snap into engagement with the notch in the driven gear and causing the tooth on said dog to snap into engagement with the notch in the driving gear whenever the roll and tooth are simultaneously in alinement respectively with the said notches, one of said gears having a larger number of teeth than the other, the number of teeth in one bearing such relation to the number of teeth in the other that each time the driving gear makes a predetermined number of revolutions the dog will be caused to engage with the driving gear and thereby cause the cam which is connected with the disk in which the dog is mounted to rotate and actuate the retrograde movement of the blank support.

31. A reciprocable bottom support for supporting and feeding a stack of blanks, a rocker member having intermediate connections for moving said support in a forward direction a predetermined distance carrying with it a stack of blanks mounted thereon, stop mechanism adapted to be engaged by the foremost blank in the stack on the support, said actuating mechanism being operative each time after the foremost blank is withdrawn to move the blank support and stack forward a distance to bring the next foremost blank against the stop thus giving to the support and stack a step by step movement until a sufficient number of blanks have been withdrawn so that the blank support shall have moved forward the predetermined distance, means whereby said support is given a retrograde movement after a predetermined number of blanks have been withdrawn from the stack, said retrograde actuating mechanism comprising a rotary driving shaft, a cam on said shaft, and means whereby the cam at each rotation of the cam actuates the said rocker member to rotate in a reverse direction to its forward movement and give a retrograde movement to the blank support, and means for controlling the time with relation to the forward movement when the retrograde movement shall begin comprising a disk and eccentric combined with said cam, all loose on said shaft, said disk having a flange with a socket recess and a spring seated dog mounted therein, a spur gear fast on said shaft having a flange with a notch therein, said dog having a tooth which at certain predetermined times engages in said notch thereby causing the disk, eccentric and cam to rotate with said driving shaft, a rotary driven spur gear which engages with the gear on said driving shaft, said dog having a roll at its outer end, said driven gear having a flange which engages said roll and normally holds the dog depressed in its socket, and thereby out of engagement with the driving gear, the flange of the driven gear having a notch with which said roll is adapted to engage, the spring on which said dog is seated causing the said roll to snap into engagement with the notch in the driven gear and causing the tooth on said dog to snap into engagement with the notch in the driving gear whenever the roll and teeth are simultaneously in alinement respectively with the said notches, one of said gears having a larger number of teeth than the other, the number of teeth in one bearing such relation to the number of teeth in the other that each time the driving gear makes a predetermined number of revolutions the dog will be caused to engage with the driving gear and thereby cause the cam which is connected with the disk in which the dog is mounted to rotate once and actuate the retrograde movement of the blank support, the flange of the driven gear causing the dog to be disengaged at the end of the revolution, means for separating the stack of blanks from contact with the said movable bottom support, and means whereby said eccentric at each rotation thereof actuates the said separating mechanism, said eccentric being so arranged that the separating will take place at the end of the forward feed and before the retrograde movement begins.

32. In combination with a reciprocable carriage for feeding blanks, means for actuating said carriage in a forward direction, means for giving a retrograde movement to the carriage comprising a driving shaft, a cam loose on said shaft, clutch mechanism for engaging the driving shaft with relation to the retrograde actuating mechanism, means whereby the clutch is engaged after a predetermined number of revolutions of the driving shaft, and means for again disengaging the clutch, said clutch mechanism comprising two intermeshing gears with an unequal number of teeth, one of said gears being fast on said driving shaft and driving the other gear, and a spring actuated dog carried by a member which is fast to the cam and loose on said driving shaft, the driving gear being formed with a notch with which a tooth on said dog is adapted to engage to make driving connection with said cam, the driven gear being formed with a portion which normally engages with said dog to restrain it from engagement with the driving gear, said restraining portion being formed with a recess which comes into alinement with the dog simultaneously with the alinement with the notch on the driving gear once for each predetermined number of revolutions of the driving gear determined by the ratio of the number of teeth on the driving gear to the number of teeth on the driven gear.

33. A reciprocable bottom support for supporting and feeding a stack of blanks, a rocker member having intermediate connections for moving said support in a forward direction a predetermined distance carrying with it a stack of blanks mounted thereon, means whereby said support is given a retrograde movement comprising a rotary driving shaft, a cam on said shaft and means whereby the cam at each rotation thereof actuates the said rocker member to rotate in a reverse direction to its forward feed movement and give a retrograde movement to the blank support, the means for controlling the time with relation to the forward movement when the retrograde movement shall begin comprising a disk combined with said cam, both loose on said shaft, said disk having a flange with a socket recess and a spring seated dog mounted therein, a gear fast on said shaft having a flange with a notch therein, said dog having a tooth which at certain predetermined times engages in said notch thereby causing the disk and cam to rotate with said driving shaft, a rotary driven gear which engages with the gear on said driving shaft, said dog having a roll at its outer end, said driven gear having a flange which engages said roll and normally holds the dog depressed in its socket, and thereby out of engagement with with the driving gear, the flange of the driven gear having a notch with which the said roll is adapted to engage, the spring on which said dog is seated causing the said roll to snap into engagement with the notch in the driven gear and causing the tooth on said dog to snap into engagement with the notch in the driving gear whenever the roll and tooth are simultaneously in alinement respectively with the said notches, one of said gears having a larger number of teeth than the other, the number of teeth in one bearing such relation to the number of teeth in the other that each time the driving gear makes a predetermined number of revolutions the dog will be caused to engage with the driving gear and thereby cause the cam which is connected with the disk in which the dog is mounted to rotate and actuate the retrograde movement of the blank support.

34. A reciprocable bottom support for a plurality of blanks, means for reciprocating said support, means for temporarily relieving the pressure of the stack on said bottom support after a predetermined forward feed, means for moving the support backward after the pressure of the blanks on the support has been relieved, and means for controlling the extent of forward feed and for rendering operative the mechanism for relieving the support from the pressure of the stack.

35. A reciprocable bottom support for a stack of blanks, means for moving the support with the stack bodily forward by successive movements, a step farther forward being taken after each removal of a blank until the support and stack have accomplished a total predetermined forward movement, means for automatically moving the support backward to its initial position after said predetermined total forward movement, means for retaining the remaining portion of the stack in its advanced position during the retrograde movement of the support, means for automatically re-depositing the stack in its advanced position on the support at the end of the retrograde movement, and means for automatically relieving the pressure of the remaining portion of the stack on the bottom support during the retrograde movement of the support with relation to the stack.

36. In combination with a driving gear, a reversely movable element adapted to be driven thereby and being normally disengaged from said driving gear, clutch mechanism for connecting the driving gear with the said reversely movable element, a driven gear, one of said gears being formed with a greater number of teeth than the other and means controlled by said gears whereby the clutch is engaged and disengaged once for each predetermined number of revolutions of the driving gear, said number of revolutions being determined by the ratio of the number of teeth on the driving gear to the number of teeth on the driven gear.

37. In combination with a driving gear, a driven gear, one of said gears being formed with a greater number of teeth than the other, a driven element which is adapted to be intermittently actuated by said driving gear, clutch mechanism which is adapted to make driving connection between said driving gear and said driven element, and means controlled by said gears whereby the clutch is engaged and disengaged once for each predetermined number of revolutions of the driving gear, said number of revolutions being determined by the ratio of the number of teeth on the driving gear to the number of teeth on the driven gear.

38. Mechanism for giving to a reciprocable element a predetermined forward movement and then a retrograde movement, said retrograde actuating mechanism comprising a driving gear, intermediate mechanism between said driving gear and said reciprocable element to actuate said element rearwardly, clutch mechanism for connecting the driving gear with the said intermediate mechanism, a driven gear which intermeshes with said driving gear, one of said gears being formed with a greater number of teeth than the other, and means controlled by said gears whereby the clutch is engaged and disengaged once for each predetermined number of revolutions of the driving gear, said number of revolutions being determined by the ratio of the number of teeth on the driving gear to the number of teeth on the driven gear.

39. In combination with a driving shaft, a driving gear fast thereon, a driven gear engaging therewith, said two gears being formed with an unequal number of teeth, a cam loose on said shaft, and a spring-actuated dog carried by a member which is fast to the cam and loose on said shaft, the driving gear being formed with a notch with which a tooth on said dog is adapted to engage to make driving connection with said cam, the driven gear being formed with a portion which normally engages with a portion of said dog to restrain it from engagement with the driving gear, said restraining portion being formed with a recess which comes into alinement with said portion of the dog simultaneously with the alinement of another portion of the dog with the notch on the driving gear, once for each predetermined number of revolutions of the driving gear, determined by the ratio of the number of teeth on the driving gear to the number of teeth on the driven gear.

In testimony whereof I affix my signature.

STANLEY R. HOWARD.